(12) United States Patent
Baiz Matuk

(10) Patent No.: US 7,440,563 B2
(45) Date of Patent: Oct. 21, 2008

(54) TELECOMMUNICATION AND ADVERTISING BUSINESS MODEL AND METHOD OF UTILIZING SAME

(75) Inventor: Enrique A Baiz Matuk, Miami Beach, FL (US)

(73) Assignee: Sumo Technologies, LLC, Miami, FL (US)

( * ) Notice: Subject to any disclaimer, the term of this patent is extended or adjusted under 35 U.S.C. 154(b) by 0 days.

(21) Appl. No.: 11/681,460

(22) Filed: Mar. 2, 2007

(65) Prior Publication Data

US 2008/0212758 A1    Sep. 4, 2008

(51) Int. Cl.
*H04M 3/42* (2006.01)

(52) U.S. Cl. .............................. 379/209.01; 379/88.25; 705/14; 709/206

(58) Field of Classification Search ................ 379/67.1, 379/209.01, 88.25; 705/14; 709/206
See application file for complete search history.

(56) References Cited

U.S. PATENT DOCUMENTS

| | | | |
|---|---|---|---|
| 6,009,150 A | 12/1999 | Kamel | |
| 6,301,342 B1 | 10/2001 | Ander et al. | |
| 6,590,970 B1 | 7/2003 | Cai et al. | |
| 6,614,896 B1 * | 9/2003 | Rao | 379/209.01 |
| 6,856,673 B1 | 2/2005 | Banks et al. | |
| 6,889,054 B2 | 5/2005 | Himmel et al. | |
| 6,947,531 B1 | 9/2005 | Lewis et al. | |
| 2001/0012344 A1 | 8/2001 | Kwon | |
| 2003/0003929 A1 | 1/2003 | Himmel et al. | |
| 2003/0050837 A1 | 3/2003 | Kim | |
| 2004/0091093 A1 | 5/2004 | Booktaff | |
| 2005/0086104 A1 | 4/2005 | McFadden | |
| 2005/0149385 A1 | 7/2005 | Trively | |
| 2007/0055565 A1 * | 3/2007 | Baur et al. | 705/14 |

* cited by examiner

*Primary Examiner*—Gerald Gauthier
(74) *Attorney, Agent, or Firm*—Albert Bordas, P.A.

(57) ABSTRACT

A telecommunication and advertising business model and method of utilizing same that permits users to make telephone calls for a predetermined amount of time according to the destination of the call. The telecommunication and advertising business model is controlled by an on-line database system and comprises customers, and companies that pay for advertising through a system.

16 Claims, 2 Drawing Sheets

TELECOMMUNICATION AND ADVERTISING BUSINESS MODEL AND METHOD OF UTILIZING SAME

BACKGROUND OF THE INVENTION

1. Field of the Invention

The present invention relates to business models, and more particularly, to telecommunication and advertising business models and methods that permit users to subscribe to a service that allows them to receive telecommunication services in return for receiving commercial messages.

2. Description of the Related Art

Many telecommunication business models have been developed in the past. None of them, however, include a system that enables the calling party, and the called party or conferenced parties, to receive the same or different advertisements or commercial messages simultaneously, in consideration for free telecommunication services. In addition, no prior telecommunication business models include a system where advertisers, from different countries, have access to an internet based system that allows them to submit commercial messages online and in real time that will be played for the caller and/or the called party and/or parties, depending on their interests.

Applicant believes that one of the closest references corresponds to U.S. Pat. No. 6,009,150, issued to Kamel on Dec. 28, 1999 for a call processing method for delivering promotional messages. However, it differs from the present invention, because Kamel teaches an interactive voice response and call process application and system for delivering promotional messages that allows a user to select a desired number of promotional messages, which are played before a connection is established. The user may also request additional promotional messages at any time during the connection in order to extend a free or subsidized connection period provided by the system. The system monitors the connection and provides a warning tone to the user prior to the end of the free or subsidized calling period. The user may then request an additional promotional message, to extend the time period, or terminate the connection in an orderly fashion.

Applicant believes that another reference corresponds to U.S. Pat. No. 6,947,531, issued to Lewis, et al. on Sep. 20, 2005 for a system and method for advertising supported communications. However, it differs from the present invention, because Lewis teaches a system and method for advertising supported communications in a telecommunications network. One method includes receiving a call request to connect a call from an originating subscriber terminal to a destination subscriber terminal. The call request includes a destination identifier such as a MIN or a PSTN telephone number associated with the destination terminal. The method further includes providing at least one advertisement to a subscriber associated with the originating terminal, determining a free calling balance for the subscriber based on the advertisements being provided to the subscriber and the destination identifier, connecting the call from the originating terminal to the destination terminal, and monitoring as well as decrementing the free calling balance as the call progresses.

Applicant believes that another reference corresponds to U.S. Pat. No. 6,590,970, issued to Cai, et al. on Jul. 8, 2003 for Intelligent-networked telephone system having advertisement with bonus free phone call service. However, it differs from the present invention, because Cai teaches a telecommunications system that allows a customer to make a free telephone call after listening to a product or service advertisement. The customer reaches a product/service menu after dialing a telephone number with a special prefix reserved for Advertisement With Bonus Call (AWBC) service. The customer then chooses the advertisement of interest. After listening to the advertisement, the system allows the customer to enter a destination number for a free bonus telephone call. In an example, the bonus call is limited to a predefined duration monitored by a timer reset at the beginning of the bonus call. When the time limit is near, the system broadcasts this fact to both the calling party and the called party. At the expiration of the time limit, the call is automatically disconnected, and the customer can be returned to the AWBC product/service main menu. Charging the bonus call to the sponsor of the product/service advertisement to which the customer has listened completes the transaction.

Applicant believes that another reference corresponds to U.S. Patent Application Publication No. 20050086104, published on Apr. 21, 2005 for Jeffrey A. McFadden and titled Delivery of advertising to telephone users. However, it differs from the present invention, because McFadden teaches advertisements that are delivered to a telephone user by detecting an interest by a user in a destination telephone number, determining a category of the destination telephone number, and providing the user an advertisement based on the category of the destination telephone number. For example, a call by a user to a destination telephone number may be detected. A database may then be consulted to determine if the destination telephone number belongs to a particular category of businesses (e.g., restaurant, movie theater, air line). If so, advertisements for similar businesses may be provided to the telephone user. This allows for delivery of relevant advertisements to telephone users.

Applicant believes that another reference corresponds to U.S. Pat. No. 6,889,054, issued to Himmel, et al. on May 3, 2005 for a method and system for schedule based advertising on a mobile phone. However, it differs from the present invention, because Himmel teaches a system for implementing a method for communicating an advertisement that employs a primary call center, a mobile station, a base station, and an advertiser call center. When the mobile station is registered with the base station, the primary call center controls a transmission of one or more advertisements to the mobile station in accordance with a schedule preferred by the mobile station user with each advertisement matching a profile of the mobile station user. The mobile station user can either store the advertisement for future reference or respond to the advertisement. The response can be an acknowledgement of the advertisement or a desire to establish a communication link between the mobile station and the advertiser call center to thereby attempt a purchase of a good or a service. In response to an advertisement, the mobile station user is provided with a reward as an incentive to regularly receive advertisements.

Applicant believes that another reference corresponds to U.S. Pat. No. 6,301,342 issued to Ander, et al. on Oct. 9, 2001 for Method relating to telephone communications including the transmission of advertising messages. However, it differs from the present invention, because Ander teaches a method relating to telecommunications in which the telephone of a first subscriber is connected to the telephone of a second subscriber via a standard telephone network and the call is billed to a third subscriber. The first subscriber first dials a subscriber number, preferably preceded by a prefix, which leads to the third subscriber and then dials a subscriber number that leads to the second subscriber. The telephone network connects the call to a telephone-network-connected computer unit that forwards the call to the second subscriber to connect the first subscriber with the second subscriber. The call between the first subscriber and the second subscriber is billed to the third subscriber, and advertisements are transmitted on the call connected between the first and second subscribers. When one of the first subscriber and the second subscriber enters a code or the like through the keypad of his or her telephone during an ongoing call, the computer unit senses the code, and upon sensing the code the computer unit interrupts the transmission of advertisements during the course of the call. The computer unit bills the remainder of the connected call in accordance with fixed telephone charges.

Applicant believes that another reference corresponds to U.S. Patent Application Publication No. 20050149385, published on Jul. 7, 2005 for Martin Churchill Trively and titled a system and method for receiving and responding to promotional offers using a mobile phone. However, it differs from the present invention, because Trively teaches a method and means by which a mobile phone can participate in a promotional offer that is sponsored by an interested party. The sponsor creates a promotional campaign and defines its parameters using promotional offer code (POC) data. The POC data is then pre-provisioned into the mobile phone. If a mobile phone user becomes aware of the promotional campaign and wishes to participate, he navigates his mobile phone menu structure to a "promotions" menu and inputs a POC that was included in the sponsor's advertisements. The mobile phone then links the input POC to the pre-provisioned POC data. Another function in the mobile phone then constructs a promotional offer entry (POE) that conforms to the parameters set out in the pre-provisioned POC data. The POE is then transmitted to the sponsor. The sponsor reviews all valid entries and chooses one or more winners. The sponsor can then broadcast a status message to all entrants to inform them whether they won anything from the promotion.

Applicant believes that another reference corresponds to U.S. Patent Application Publication No. 20040091093, published on May 13, 2004 for Blake Bookstaff titled a method and system for providing advertising to telephone callers. However, it differs from the present invention, because Bookstaff teaches a system and method for providing one or more advertisements, services, surveys, offers for goods/services, and/or offers to modify a telephone service plan ("intercept actions" collectively) to one or more parties to a telephone call. One or more advertisements may be provided during one or more points along an unsuccessful or successful telephone call. One or more services may be provided gratuitously or in exchange for the presentation of one or more advertisements to recipient of the service. Additionally, a telephone service plan associated with the caller or callee may be analyzed and the caller/callee may be presented with the option to activate one or more service features that, at the time of the attempted call, are not activated in the telephone service plan. A survey may be provided to the caller/callee and the responses recorded. The caller/callee may also receive an offer for goods or services. These intercept actions may be provided during any of a plurality of points along a telephone call, such as prior to dialing; before, after or during a busy signal or ring tones; after one party disconnects but prior to the remaining party or parties disconnecting; and the like.

Applicant believes that another reference corresponds to U.S. Patent Application Publication No. 20030050837, published on Mar. 13, 2003 for Do Sik Kim titled Method and system providing advertisement using tone of ringing sounds of mobile phone and commercial transaction service in association with the same. However, it differs from the present invention, because Kim teaches a method and system providing an advertisement using a tone of ringing sounds of a mobile phone terminal, and a commercial transaction service in association with the same. An advertisement is output instead of an incoming call ring sound which rings when a user of the mobile phone terminal receives the call, or for a predetermined time from start of an outgoing call which is achieved by pressing a telephone number of a called party and a SEND button for making a phone call to reception of a response signal of the called party, and a benefit bestowed to the user according to the advertisement listening or watching is spread to product purchase to thereby enhance an advertisement effect. Preferably, an advertisement or melody in the form of music, message, still images and motion images is downloaded in the mobile phone terminal and the downloaded advertisement or melody is listened to or watched instead of an incoming call sound or until a call is accomplished after a phone call has been transmitted. The number of times of listening to or watching the advertisement is counted and actual purchase on an on-line or off-line of a corresponding advertisement product of a member who has listened to or watched is deposited together with the advertisement listening or watching number of times, to thereby provide a variety of benefits such as a phone call fee reduction, a cash back, a mileage point, or a subsidy of purchase of a new terminal. Thus, the maximum advertisement effect can be heightened without having no harm to call, and service can he provided so that a benefit on purchase is bestowed to a member who listens to or watches the advertisement via a phone call fee discount and a point/mileage deposit with respect to purchase transaction on the on-line and off-line commercial transaction system.

Applicant believes that another reference corresponds to U.S. Patent Application Publication No. 20010012344, published on Aug. 9, 2001 for Hwang-Sub Kwon titled an advertising method and system for providing advertisement and telephone-call service. However, it differs from the present invention, because Kwon teaches an advertising method using a public telephone and a system for providing free or discounted call service according to watching of an advertisement. A public telephone, a relay server, a communication line provider, an advertiser server and an Internet information server are connected through a communication network together. The relay server receives advertisement information from the advertiser server or the Internet information server and displays advertisement information through a display device of the public telephone for advertisement. The public telephone periodically downloads renewed advertisement information from the relay server to renew it. A user is benefited by free-call or discounted-call service depending on seeing and hearing of an advertisement over a given number. The multifunctional public telephone, which is installed at an unspecified location and displays advertisements, provides advertising effect of a high level for a low price to advertisers.

Applicant believes that another reference corresponds to U.S. Pat. No. 6,856,673, issued to Banks, et al. on Feb. 15, 2005 for Targeted advertising in a telephone dialing system. However, it differs from the present invention, because Banks teaches a system and method for providing targeted advertising to telephone callers in mid-dial. It monitors the dialing activities of a caller. When a caller enters a partial desired telephone number, an embodiment receives the partial number and determines whether an advertisement should be presented to the caller. If all of the appropriate conditions are met, a selected advertisement is transmitted to the caller's telephony device and the caller is given the opportunity to respond to the advertisement before the dialing operation completes.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a telecommunication and advertising business model and method of utilizing same that permits users to subscribe to a service that allows them to make use of telecommunication services with other users in exchange for all of them receiving advertisements and/or commercial messages.

It is another object of this invention to provide a telecommunication and advertising business model and method of utilizing same wherein worldwide companies and/or advertisers advertise to all users through a system.

It is another object of this invention to provide a telecommunication and advertising business model and method of utilizing same that permits users to make free unlimited telephone calls with interruptions that will occur at predetermined times for commercial messages, which depend on the advertiser, destination, whether the user or users is/are member(s) of the system, and other factors.

It is yet another object of this invention to provide a telecommunication and advertising business model and method of utilizing same that provides companies and/or advertisers with a system that will allow them to access their advertisements and/or commercial messages via an Internet browser.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
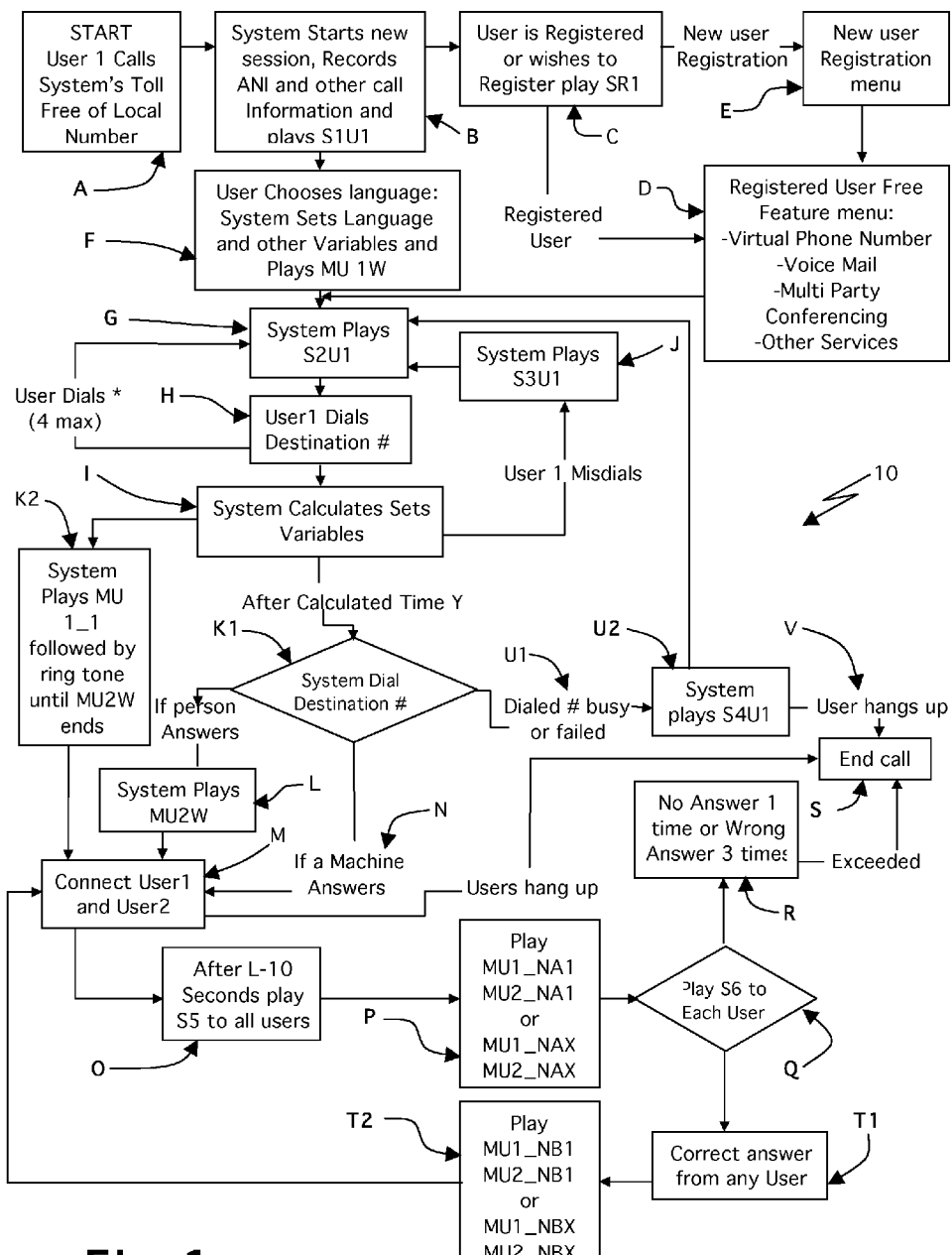
FIG. 1 shows a schematic overview of key components and the flow of information between the key components of the present invention, defined as a telecommunication and advertising business model and method of utilizing same.

Referring now to the drawings, the telecommunication and advertising business model of the present invention is generally referred to with numeral 10.

As seen in FIG. 1, the telecommunication and advertising business model 10 permits users to make telephone calls. During those telephone calls, interruptions will occur at predetermined times for commercial messages. Predetermined factors determine the commercial messages used, including but not limited to, demographics of a user, destination, advertising, and membership. It is noted that users comprise a calling party, a party that initiates a telecommunication call, defined as user 1; a called party, a party that receives the initiated telecommunication call from the calling party, defined as user 2, and several other parties, each being a different user when there is a teleconference.

The present invention permits users to subscribe to a service that allows them to receive telecommunication services. Such telecommunication services include, but are not limited to, international and national long distance communications, voice mail, and conferencing, in return for all parties receiving advertisements and/or commercial messages. A calling party and the called parties will receive advertisements and/or commercial messages that may be identical and/or different, and simultaneous.

The system also allows temporary guests who have not yet subscribed to the service to make use of them. The system is intelligent and based on a caller ID (Automatic Number Identification, ANI), a destination number (Dialed Number Information Services, DNIS), the time of day, and other factors that will decide what advertisements and/or commercial messages are most suitable to play. Advertisers that can be on different sides of the communication fund the system.

The system also requests users to dial a digit or a DTMF (Dual Tone Multi Frequency) during all or some advertising messages in order to continue with the call. This provides proof to the advertisers that the users listened to the advertising messages.

Figure 2:
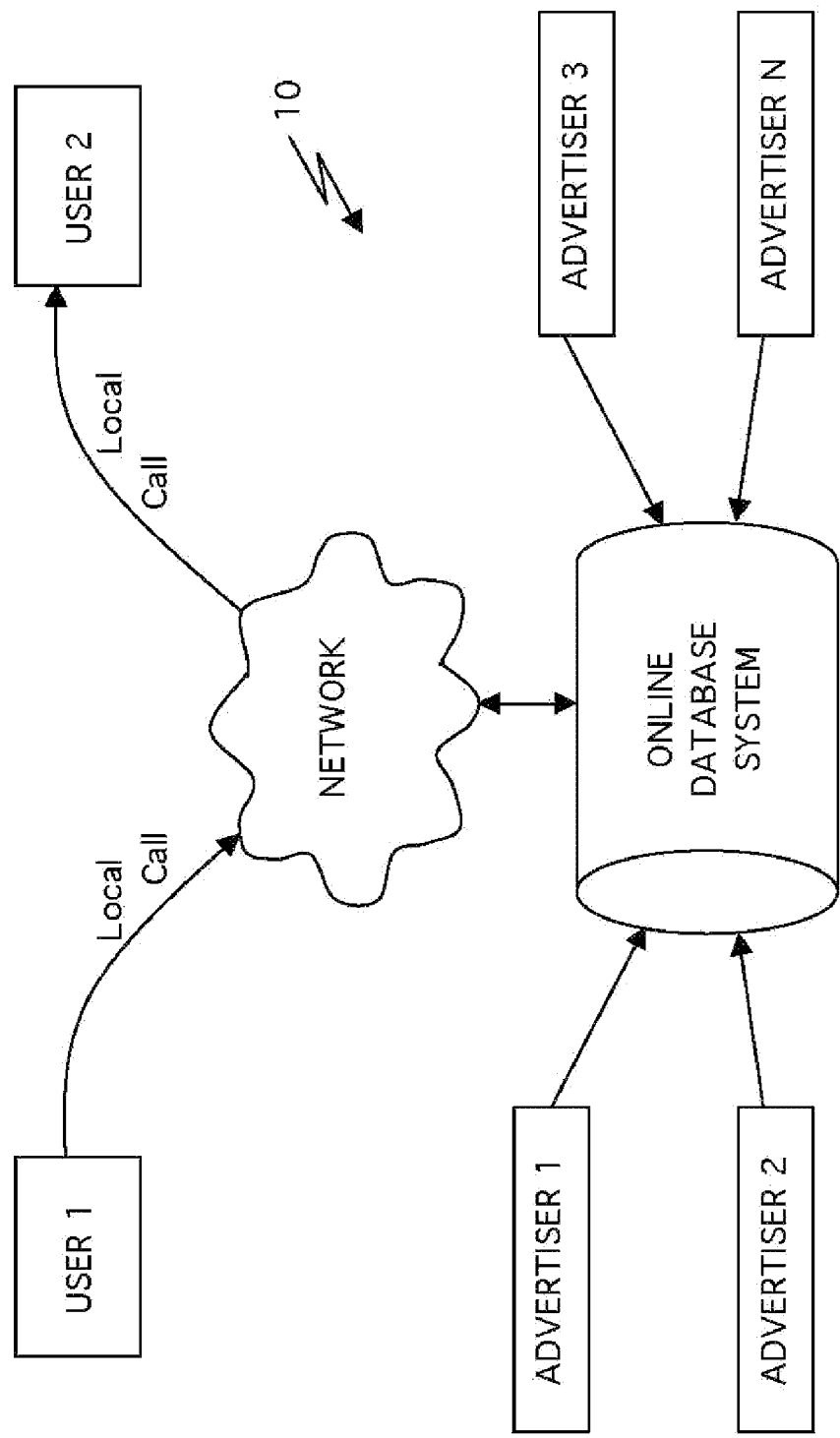
FIG. 2 is a schematic diagram that provides further detail regarding relationships and flow of information between the key components shown in FIG. 1.

As further illustrated in FIG. 1, and as seen in FIG. 2, the method for utilizing a telecommunication and advertising business model comprises a subscription-based membership for free predetermined telecommunication and advertising services for users that are funded by advertisers and/or companies.

The method for utilizing a telecommunication and advertising business model, having a system, plays free simultaneously identical or different commercial advertisements/messages to at least two users. Advertisers and/or companies fund the free simultaneously identical or different commercial advertisements/messages. In the preferred embodiment of the method, the free simultaneously identical or different commercial advertisements/messages comprise at least a first portion and a second portion. An identical or different random DTMF number request is made to the at least two users after the first portion and before the second portion. The second portion plays only when the identical or different random DTMF number request is properly responded to by the at least two users. The identical or different random DTMF number request is made to the at least two users, to ensure that they are listening to the free simultaneously identical or different commercial advertisements/messages.

A list of acronyms is defined in Chart 1 below for FIG. 1 that shows a schematic overview of key components and the flow of information between the key components of the present invention:

CHART 1

| Acronym | Definition |
|---|---|
| S1U1 | 1 for English, 2 for Spanish, 3 Other Languages 4 if Registered User or to Register |
| SR1 | 1 Registered 2 New Registration |
| MU1W | Welcome Advertising Message to Originating User 1 |
| MUXW | Welcome Advertising Message to User X |
| S2U1 | Dial destination number DTMF Request, if mistake please press STAR* |
| S3U1 | The dialed number was wrong |
| MU1_1, MU1_X | Advertising Messages |
| S4U1 | The number you dialed is busy/no connection available, dial again or try again later |
| S5 | Warning Tone |
| MU1_NA1 MU2_NA1 | (advertiser) brings you the next portion of your call |

CHART 1-continued

| Acronym | Definition |
|---|---|
| S6 | random DTMF request. And Repeat twice if incorrect once if no answer |
| MU1_NB1, MU2_NB1 . . . | 2nd part of MUX_NA1 |

A glossary of terms is defined in Chart 2 for Chart 1 as follows:

CHART 2

| | |
|---|---|
| Y | Function of (advertisement, average time to ring tone, average answering time, other variables |
| L | Allowed call time segment per destination per ad |
| S | System Message |
| U1 | User 1, Originating User |
| M | Ad Message |
| W | Welcome message |
| X | Integer |

As best seen in FIG. 2, the telecommunication business model 10 comprises advertisers that are defined as companies or advertising agencies that pay a fee for advertising commercial messages through the telecommunication business model 10. The advertisers submit their respective commercial messages to an on-line database system, and the on-line database system in turn publishes them over a network to the calling and called parties. Companies or advertisers advertise their products and services, and have access to a unique Internet based worldwide accessible system to allow them to manage their advertisements and/or commercial messages online.

The free simultaneously identical or different commercial advertisements/messages are provided through the on-line database system, and in the preferred embodiment, are managed through the network by the advertisers and/or companies. Such a network may be the world-wide-web or Internet.

In one application of the method, the telecommunication and advertising business model, comprises the steps of:

Step A: calling a system, toll or local telephone number, by a user 1;

Step B: starting a new session by said system, said system recording an ANI and requesting from said user 1 a preferred language, and allowing said user 1 to enter as a member or register, said system proceeding to Step C if said user 1 is registered or wishes to register in said system and said system proceeding to Step F otherwise;

Step C: playing a first message to said user 1, said system proceeding to Step D if said user 1 is registered in said system and said system proceeding to Step E otherwise;

Step D: reaching a subscription-based membership user free-feature menu, comprising a virtual phone number, voice-mail, and multi-party conferencing, said system proceeding to Step G if said user 1 said is registered in said system;

Step E: reaching a registration menu to register, if said user 1 wishes to register and said system proceeding to Step D;

Step F: choosing a language by said user 1, said system setting language based on a selection by said user 1 and playing a second message to said user 1;

Step G: playing dial destination number DTMF request by said system and said user 1 pressing a key if a mistake is made;

Step H: dialing a destination telephone number by said user 1;

Step I: calculating cost per minute, ad duration, call segment duration time "L", ad frequency, and delay time "Y" to start dialing, and determining which commercial advertisements/messages to play based on demographics of said user 1, said system proceeding to Step J if said user 1 misdials and said system proceeding to Step K1 and K2 otherwise;

Step J: playing a third message to said user 1 by said system if said user 1 misdials, said system proceeding to Step G;

Step K1: waiting for said delay time "Y" and dialing said destination telephone number by said system, said system proceeding to Step L if said user 2 is available to receive answer a telephone call, said system proceeding to Step N if said telephone call is to be answered by an automated telephone answering service, and said system proceeding to Step U1 otherwise;

Step K2: playing a fourth message to said user 1 followed by a ring tone by said system until said system completes playing a fifth message in Step L to a user 2, said system proceeding to Step M;

Step L: answering said telephone call by said user 2 and playing said fifth message to said user 2 by said system;

Step M: connecting said user 1 to said user 2 by said system, said system proceeding to Step O;

Step N: answering said telephone call by an automated telephone answering service and said system proceeding to Step M;

Step O: calculating said call segment duration time "L" minus a first predetermined time period and playing a sixth message to said users 1 and 2 indicating that said telephone call will be interrupted at end of said first predetermined time period;

Step P: playing simultaneously a first portion of identical or different first messages to said users 1 and 2;

Step Q: asking simultaneously said users 1 and 2 for an identical or different random DTMF number request, said system proceeding to Step R if said random DTMF number request is incorrectly answered or is not answered at all by said users 1 and 2 within said first predetermined number of times, said system proceeding to Step T1 otherwise;

Step R: repeating said random DTMF number request a first predetermined number of times if incorrect or if no answer, to said users 1 and 2;

Step S: terminating said telephone call;

Step T1: answering said random DTMF number request correctly within said first predetermined number of times by said users 1 and 2;

Step T2: playing simultaneous remainder of said identical or different first messages to said users 1 and 2 and going to Step M;

Step U1: attempting said destination telephone number if busy or fails;

Step U2: playing a seventh message to said user 1 that said destination number is busy or has failed, said system proceeding to Step G to retry said destination number, and said system proceeding to Step V otherwise; and Step V: terminating said telephone call at any time if either of said users 1 or 2 disconnects.

In step A) of the method, calling a system, toll or local telephone number, by a user 1; the user 1 may incur a local telephone calling expense.

In step B) of the method, starting a new session by said system, said system recording an ANI and requesting from said user 1 a preferred language, and allowing said user 1 to enter as a member or register, said system proceeding to Step C if said user 1 is registered or wishes to register in said system and said system proceeding to Step F otherwise; the ANI defines an automatic number identification.

In step C) of the method, playing a first message to said user 1, said system proceeding to Step D if said user 1 is registered in said system and said system proceeding to Step E otherwise; the first message may comprise playing "number 1 if registered, or number 2 for new registration" depending on whether the user 1 is registered in said system or wishes to register.

In step D) of the method, reaching a subscription-based membership user free-feature menu, comprising a virtual phone number, voicemail, and multi-party conferencing, said system proceeding to Step G if said user 1 said is registered in said system; the system provides these services at no cost to the user 1.

In step E) of the method, reaching a registration menu to register, if said user 1 wishes to register and said system proceeding to Step D; only registered users may access said menu.

In step F) of the method, choosing a language by said user 1, said system setting language based on a selection by said user 1 and playing a second message to said user 1; the second message may comprise playing a welcome advertisement message to said user 1.

In step G) of the method, playing dial destination number DTMF request by said system and said user 1 pressing a key if a mistake is made; the key may be the telephone's star key as an example. DTMF defines a dual tone multi frequency.

In step H) of the method, dialing a destination telephone number by said user 1; the user 1 dials the desired destination telephone number.

In step I) of the method, calculating cost per minute, ad duration, call segment duration time "L", ad frequency, and delay time "Y" to start dialing, and determining which commercial advertisements/messages to play based on demographics of said user 1, said system proceeding to Step J if said user 1 misdials and said system proceeding to Step K1 and K2 otherwise; the system comprises data from advertisers calculating the above-referenced.

In step J) of the method, playing a third message to said user 1 by said system if said user 1 misdials, said system proceeding to Step G; the third message may comprise playing "the dialed number was wrong" by the system.

In step K1) of the method, waiting for said delay time "Y" and dialing said destination telephone number by said system, said system proceeding to Step L if said user 2 is available to receive answer a telephone call, said system proceeding to Step N if said telephone call is to be answered by an automated telephone answering service, and said system proceeding to Step U1 otherwise; the system minimizes this time.

In step K2) of the method, playing a fourth message to said user 1 followed by a ring tone by said system until said system completes playing a fifth message in Step L to a user 2, said system proceeding to Step M; the fourth message may comprise playing "this telephone call is bought to you by "a particular company or brand name"". The fifth message may comprise playing "this telephone call is bought to you by "a particular company or brand name"".

In step L) of the method, answering said telephone call by said user 2 and playing said fifth message to said user 2 by said system; the user 2 hears the fifth message upon receiving the telephone call.

In step M) of the method, connecting said user 1 to said user 2 by said system, said system proceeding to Step O; the system makes the connection.

In step N) of the method, answering said telephone call by an automated telephone answering service and said system proceeding to Step M; this step occurs when user 2 is not available.

In step O) of the method, calculating said call segment duration time "L" minus a first predetermined time period and playing a sixth message to said users 1 and 2 indicating that said telephone call will be interrupted at end of said first predetermined time period; the first predetermined time period may be 10 seconds and the sixth message may comprise playing "your telephone call will be interrupted in 10 seconds".

In step P) of the method, playing simultaneously a first portion of identical or different first messages to said users 1 and 2; the system can play messages in different languages too, and if it's a multi-party conference, the identical or different first messages are played to all users or parties.

In step Q) of the method, asking simultaneously said users 1 and 2 for an identical or different random DTMF number request, said system proceeding to Step R if said random DTMF number request is incorrectly answered or is not answered at all by said users 1 and 2 within said first predetermined number of times, said system proceeding to Step T1 otherwise; requesting the users to select a specific DTMF number ensures that all the users are actually listening to the advertising messages.

In step R) of the method, repeating said random DTMF number request a first predetermined number of times if incorrect or if no answer, to said users 1 and 2; as stated above, requesting the users to select a specific DTMF number ensures that all the users are actually listening to the advertising messages.

In step S) of the method, terminating said telephone call; the system simply ends the telephone call.

In step T1) of the method, answering said random DTMF number request correctly within said first predetermined number of times by said users 1 and 2; the first predetermined times may be three as an example.

In step T2) of the method, playing simultaneous remainder of said identical or different first messages to said users 1 and 2 and going to Step M; the remainder of the first messages is played.

In step U1) of the method, attempting said destination telephone number if busy or fails; the system tries to connect the destination telephone number.

In step U2) of the method, playing a seventh message to said user 1 that said destination number is busy or has failed, said system proceeding to Step G to retry said destination number, and said system proceeding to Step V otherwise; the system notifies the user 1 that the destination number is busy or has failed.

In step V) of the method, terminating said telephone call at any time if either of said users 1 or 2 disconnects; the system prepares for a new session.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A method for utilizing a telecommunication and advertising business model comprising subscription-based membership for free predetermined telecommunication and advertising services for users that are funded by advertisers or companies, comprising playing simultaneously different commercial advertisements/messages to at least two users that are funded by said advertisers or companies when said at least two users are an originator of a telephone call and a recipient of said telephone call, said originator of a telephone call is a first person and said recipient of said telephone call is a second person.

2. The method for utilizing a telecommunication and advertising business model set forth in claim 1, further characterized in that said simultaneously different commercial advertisements/messages comprise at least a first portion and a second portion.

3. The method for utilizing a telecommunication and advertising business model set forth in claim 2, further characterized in that an identical or different random DTMF number request is made to said at least two users after said first portion and before said second portion.

4. The method for utilizing a telecommunication and advertising business model set forth in claim 3, further characterized in that said second portion plays only when said identical or different random DTMF number request is properly responded to by one of said at least two users.

5. The method for utilizing a telecommunication and advertising business model set forth in claim 4, further characterized in that said identical or different random DTMF number request is made to said at least two users to ensure that said at least two users are listening to said simultaneously different commercial advertisements/messages.

6. The method for utilizing a telecommunication and advertising business model set forth in claim 5, further characterized in that said simultaneously different commercial advertisements/messages are provided through an on-line database system.

7. The method for utilizing a telecommunication and advertising business model set forth in claim 6, further characterized in that said simultaneously different commercial advertisements/messages are managed through a network by said advertisers or companies.

8. The method for utilizing a telecommunication and advertising business model set forth in claim 7, further characterized in that said network is a world-wide-web.

9. A method for utilizing a telecommunication and advertising business model, comprises the steps of:
Step A: calling a system, toll or local telephone number, by a user 1;
Step B: starting a new session by said system, said system recording an ANI and requesting from said user 1 a preferred language, and allowing said user 1 to enter as a member or register, said system proceeding to Step C if said user 1 is registered or wishes to register in said system and said system proceeding to Step F otherwise;
Step C: playing a first message to said user 1, said system proceeding to Step D if said user 1 is registered in said system and said system proceeding to Step E otherwise;
Step D: reaching a subscription-based membership user free-feature menu, comprising a virtual phone number, voicemail, and multi-party conferencing, said system proceeding to Step G if said user 1 said is registered in said system;
Step E: reaching a registration menu to register, if said user 1 wishes to register and said system proceeding to Step D;
Step F: choosing a language by said user 1, said system setting language based on a selection by said user 1 and playing a second message to said user 1;
Step G: playing dial destination number DTMF request by said system and said user 1 pressing a key if a mistake is made;
Step H: dialing a destination telephone number by said user 1;
Step I: calculating cost per minute, ad duration, call segment duration time "L", ad frequency, and delay time "Y" to start dialing, and determining which commercial advertisements/messages to play based on demographics of said user 1, said system proceeding to Step J if said user 1 misdials and said system proceeding to Step K1 and K2 otherwise;
Step J: playing a third message to said user 1 by said system if said user 1 misdials, said system proceeding to Step G;
Step K1: waiting for said delay time "Y" and dialing said destination telephone number by said system, said system proceeding to Step L if said user 2 is available to receive answer a telephone call, said system proceeding to Step N if said telephone call is to be answered by an automated telephone answering service, and said system proceeding to Step U1 otherwise;
Step K2: playing a fourth message to said user 1 followed by a ring tone by said system until said system completes playing a fifth message in Step L to a user 2, said system proceeding to Step M;
Step L: answering said telephone call by said user 2 and playing said fifth message to said user 2 by said system;
Step M: connecting said user 1 to said user 2 by said system, said system proceeding to Step O;
Step N: answering said telephone call by an automated telephone answering service and said system proceeding to Step M;
Step O: calculating said call segment duration time "L" minus a first predetermined time period and playing a sixth message to said users 1 and 2 indicating that said telephone call will be interrupted at end of said first predetermined time period;
Step P: playing simultaneously a first portion of identical or different first messages to said users 1 and 2;
Step Q: asking simultaneously said users 1 and 2 for an identical or different random DTMF number request, said system proceeding to Step R if said random DTMF number request is incorrectly answered or is not answered at all by said users 1 and 2 within said first predetermined number of times, said system proceeding to Step T1 otherwise;
Step R: repeating said random DTMF number request a first predetermined number of times if incorrect or if no answer, to said users 1 and 2;
Step S: terminating said telephone call;
Step T1: answering said random DTMF number request correctly within said first predetermined number of times by said users 1 and 2;
Step T2: playing simultaneous remainder of said identical or different first messages to said users 1 and 2 and going to Step M;
Step U1: attempting said destination telephone number if busy or fails;
Step U2: playing a seventh message to said user 1 that said destination number is busy or has failed, said system proceeding to Step G to retry said destination number, and said system proceeding to Step V otherwise; and
Step V: terminating said telephone call at any time if either of said users 1 or 2 disconnects.

10. A method for utilizing a telecommunication and advertising business model comprising subscription-based membership for free predetermined telecommunication and advertising services that are funded by advertisers, comprising playing simultaneously different commercial advertisements/messages to at least a first person and a second person that are funded by said advertisers when said first person as an originator of a telephone call calls said second person, said simultaneously different commercial advertisements/messages comprise at least a first portion and a second portion.

11. The method for utilizing a telecommunication and advertising business model set forth in claim 10, further characterized in that an identical or different random DTMF number request is made to said first person and said second person after said first portion and before said second portion.

12. The method for utilizing a telecommunication and advertising business model set forth in claim 11, further characterized in that said second portion plays only when said identical or different random DTMF number request is properly responded to by said first person and said second person.

13. The method for utilizing a telecommunication and advertising business model set forth in claim 12, further characterized in that said identical or different random DTMF number request is made by said first person and said second person to ensure that said first person and said second person are listening to said simultaneously different commercial advertisements/messages.

14. The method for utilizing a telecommunication and advertising business model set forth in claim 13, further characterized in that said simultaneously different commercial advertisements/messages are provided through an on-line database system.

15. The method for utilizing a telecommunication and advertising business model set forth in claim 14, further characterized in that said simultaneously different commercial advertisements/messages are managed through a network by said advertisers or companies.

16. The method for utilizing a telecommunication and advertising business model set forth in claim 15, further characterized in that said network is a world-wide-web.

* * * * *